US005407027A

United States Patent [19]
Suzuki et al.

[11] Patent Number: 5,407,027
[45] Date of Patent: Apr. 18, 1995

[54] ELEVATOR CONTROL APPARATUS WITH COMPENSATION FOR CURRENT SENSOR OFFSET VOLTAGE

[75] Inventors: Satoshi Suzuki; Masayuki Yoshida, both of Inazawa, Japan

[73] Assignee: Mitsubishi Denki Kabushiki Kaisha, Tokyo, Japan

[21] Appl. No.: 945,619

[22] Filed: Sep. 16, 1992

[30] Foreign Application Priority Data

Sep. 20, 1991 [JP] Japan .................. 3-241733

[51] Int. Cl.⁶ ........................... B66B 1/06
[52] U.S. Cl. .................. 187/277; 187/289; 318/801; 363/35; 363/98
[58] Field of Search ............ 187/112, 115, 119; 318/798, 800, 801, 802, 803, 632; 363/37, 35, 97, 98, 43

[56] References Cited

U.S. PATENT DOCUMENTS

| | | | |
|---|---|---|---|
| 4,576,253 | 3/1986 | Tanahashi et al. | 187/119 |
| 4,779,708 | 10/1988 | Sasao et al. | 187/119 |
| 5,105,352 | 4/1992 | Iwasa et al. | 363/98 |

FOREIGN PATENT DOCUMENTS 60-228378  7/1985  Japan .

Primary Examiner—Thomas M. Dougherty
Assistant Examiner—Robert Nappi
Attorney, Agent, or Firm—Leydig, Voit & Mayer

[57] ABSTRACT

An elevator control apparatus has a converter for converting AC power to DC power, an inverter for converting the DC power resulting from the conversion by the converter into AC voltage of a variable voltage and a variable frequency so as to drive with the AC voltage an induction motor for vertically moving an elevator car, a current detector for detecting the current output by the inverter and for producing an output signal indicative of the detected current, a current command generating circuit for generating a current command value for the induction motor, and a control circuit for controlling the inverter on the basis of both the current command value from the current command generating circuit and the output signal from the current detector. The control apparatus includes a cancellation circuit for cancelling offset voltage by storing, when the inverter is stopped while the current command generating circuit keeps generating the current command value, the output signal of the current detector, and by adding, when the inverter is in operation, the stored output signal to the present output signal of the current detector.

7 Claims, 3 Drawing Sheets

ELEVATOR CONTROL APPARATUS WITH COMPENSATION FOR CURRENT SENSOR OFFSET VOLTAGE

BACKGROUND OF THE INVENTION

1. Field of the Invention

The present invention relates to an elevator control apparatus and, specifically, to an elevator control apparatus which performs electric current feedback control to drive an induction motor.

2. Description of the Related Art

Hitherto, a system has been known in which a drive and control apparatus, employing a pulse-width-modulation control type inverter, controls an induction motor to vertically move an elevator car.

FIG. 2 shows an example of the construction of a conventional elevator control apparatus employing an inverter of the above-mentioned type. Referring to FIG. 2, the system includes a converter 1 for converting three-phase alternating current (AC) power (comprising R-phase, S-phase and T-phase components) into direct current (DC) power, a smoothing capacitor 2 for smoothing DC output of the converter 1, an inverter 3 for converting DC power smoothed by the smoothing capacitor 2 into three-phase AC power of a variable voltage and a variable frequency, an induction motor 4 driven by AC power from the inverter 3, a sheave 5 connected to the induction motor 4, and a rope 6 wound on the sheave 5 with one end of the rope connected to a counterweight 7, and the other to a car 8. The system further includes current detectors 9 and 10 for detecting phase current of U-phase and v-phase, respectively, for the induction motor 4, a current command generating circuit 11, and operational amplifiers 12, 13 and 14 for U-phase, V-phase and W-phase, respectively, which are connected to the current command generating circuit 11, the operational amplifiers 12 and 13 being connected to receive the respective outputs of the current detectors 9 and 10, and the operational amplifier 14 being connected to receive outputs from the current detectors 9 and 10. The operational amplifiers 12 and 13 include differential amplifiers 12a and 13a, respectively, while the operational amplifier 14 includes differential amplifiers 14a and 14b. A triangular wave generating circuit 15 is provided to generate a triangular wave serving as a carrier wave for pulse-width-modulation control. Comparators 16, 17 and 18 are provided to compare the respective outputs of the operational amplifiers 12, 13 and 14 with the output of the triangular wave generating circuit 15. An inverter stoppage signal generating circuit 19 is provided to generate a signal commanding stoppage of the inverter 3. An inverter control circuit 20 is provided to control the inverter 3 in accordance with the outputs of the comparators 16, 17 and 18.

Next, the operation of the apparatus will be described. When a speed command generating circuit (not shown) generates a speed command, in order that the elevator car 8 will travel in accordance with the command, the inverter stoppage signal from the inverter stoppage signal generating circuit 19 is extinguished, and the current command generating circuit 11 generates current command values $I_{cu}$ and $I_{cv}$ of current that should flow to the induction motor 4. The current detectors 9 and 10 detect the current flowing to the induction motor 4, and output the detected current as current feedback signals $I_u$ and $I_v$. Subsequently, each of the operational amplifiers 12 and 13 operates with respect to U-phase or V-phase to amplify the difference between the current command value $I_{cu}$ or $I_{cv}$, on one hand, and the current feedback signal values $I_u$ or $I_v$, on the other, and outputs the amplified difference $P_{wu}$ or $P_{wv}$ in U- or V-phase. With respect to W-phase, the operational amplifier 14 synthesizes and then amplifies the differences in U-phase and V-phase as between the current command values $I_{cu}$ and $I_{cv}$, on one hand, and the current feedback signal $I_u$ and $I_v$, on the other, and outputs the resultant difference $P_{ww}$ in W-phase. Each of the comparators 16, 17 and 18 compares one of the differences $P_{wu}$, $P_{wv}$ and $P_{ww}$ with triangular wave generated by the triangular wave generating circuit 15, performs pulse-width modulation, and sends the resultant pulse signal to the inverter control circuit 20. In accordance with the pulse signals from the comparators 16, 17 and 18, the inverter control circuit 20 controls a switching element, such as a transistor or insulated-gate bipolar transistor constituting the inverter 3 so that desired AC power is supplied to the induction motor 4. This enables the car 8 of the elevator to ascended or descend in accordance with the speed command.

It is necessary to control the speed of the car 8 in a smooth manner and within a wide range from a start to a subsequent stop. Whether such control is performed or not greatly depends on the accuracy of detection by the current detectors 9 and 10. This is for the following reason: The current detectors 9 and 10 are, as stated before, provided to detect the AC current flowing to the induction motor 4 for driving the elevator car 8. If the outputs of the current detectors 9 and 10 include DC offset voltage, torque ripple is generated due to the offset voltage. The torque ripple may cause vibration of the car 8, making it uncomfortable to ride in the car. The offset voltage varies with variations in the temperature of the current detectors 9 and 10 or variations thereof caused by the passage of time. Therefore, adjusting the offset voltage to zero when shipping the current detectors as products does not makes it possible to prevent generation of offset voltage during operation.

Conventional efforts to overcome the above-described problem include the art disclosed, e.g., in Japanese Patent Laid-Open No. 60-23268. FIGS. 3 and 4 show different arrangements disclosed in the above document. These figures each show only that part of the arrangement related to the U-phase because the remaining part is the same as that shown in FIG. 2, and because the construction is the same with respect to all of the U-, V- and W-phases. The arrangement shown in FIG. 3 includes an offset voltage cancellation circuit 21 having a sample-and-hold circuit 21a for sampling and holing outputs of the operational amplifier 12 in response to an inverter stoppage signal, a contact 21b for disconnecting the output of the sample-and-hold circuit 21a, and a capacitor 21c for allowing the sample-and-hold circuit 21a to maintain a voltage. The arrangement shown in FIG. 4 includes an offset voltage cancellation circuit 22 having an A/D converter 22a for converting an analog signal from the operational amplifier 12 into a corresponding digital signal, a memory 22b for storing the digital signal output by the A/D converter 22a, and a D/A converter 22c for converting the digital signal from the memory 22b into a corresponding analog signal, the arrangement shown in FIG. 4 also includes a main control circuit 23 for controlling, in accordance with an inverter stoppage signal, the A/D converter 22a, the memory 22b and the D/A converter 22c.

The arrangement shown in FIG. 3 provides the following operation. When the elevator car 8 has stopped, and the inverter stoppage signal generating circuit 19 generates an inverter stoppage signal, the sample-and-hold circuit 21a starts sampling the output $P_{wu}$ of the operational amplifier 12. At this time, the current command generating circuit 11 is controlled in such a manner that the current command value $I_{cu}$, serving as the input to the operational amplifier 12, becomes zero. Consequently, the inverter 3 is stopped and no current flows to the induction motor 4 so that the current feedback signal $I_u$ from the current detector 9 represents only the offset voltage of the current detector 9. Further, the contact 21b is opened so that no signal is applied from the sample-and-hold circuit 21a to the operational amplifier 12. As a result, only the offset voltage of the current detector 9 is, after being amplified by the differential amplifier 12a, output at the output terminal of the operational amplifier 12, which output is stored by the sample-and-hold circuit 21a. Thereafter, when the inverter stoppage signal is extinguished in order to start the car 8, the sample-and-hold circuit 21a is brought into its holding state, in which the output $P_{wu}$ of the operational amplifier 12 sampled during the stop period of the car 8 is held. The contact 21b is closed so that the output $P_{wu}$ stored by the sample-and-hold circuit 21a is supplied to the operational amplifier 12, whereby the offset voltage of the current detector 9 is cancelled.

With the arrangement shown in FIG. 4, when the elevator car 8 has stopped, and the inverter stoppage signal generating circuit 19 generates an inverter stoppage signal, the main control circuit 23 causes the output $P_{wu}$ of the operational amplifier 12 to be supplied through the A/D converter 22a to the memory 22b to be stored therein. At this time, similarly to the case shown in FIG. 3, the current command generating circuit 11 is controlled in such a manner that the current command value $I_{cu}$, serving as the input to the operational amplifier 12, becomes zero. Consequently, the current feedback signal $I_u$ from the current detector 9 represents only the offset voltage of the current detector 9, and the control circuit 23 operates to output zero at the output terminal of the D/A converter 22c. As a result, only the offset voltage of the current detector 9 is, after being amplified by the differential amplifier 12a, output at the output terminal of the operational amplifier 12, and this output is stored into the memory 22b through the A/D converter 22a. Thereafter, when the inverter stoppage signal is extinguished to start the car 8, the main control circuit 23 operates to cause the output $P_{wu}$ of the operational amplifier 12 stored in the memory 22b during the stop period of the car 8 to be supplied through the D/A converter 22c to the operational amplifier 12. In this way, the offset voltage of the current detector 9 is cancelled, thereby enabling torque ripple to be restrained from being generated in the induction motor 4 due to the offset voltage.

A conventional elevator control apparatus, such as that described above, is arranged such that each offset voltage cancellation circuit stores the output of an operational amplifier. Accordingly, it is necessary that those inputs to the operational amplifiers other than the offset voltage of the current detectors be made zero. However, this requirement makes it impossible to keep outputting the current command even during the stoppage period of the inverter in order to detect faults in the inverter stoppage signal generating circuit (as shown, e.g., in Japanese Patent Laid-Open No. 60-228378), which is disadvantageous from the viewpoint of safety.

Since the conventional arrangement shown in FIG. 4, in which the offset voltage of the current detectors is sampled, requires the inclusion of elements such as an A/D converter and a memory, the entire apparatus is relatively expensive, which is another disadvantage.

SUMMARY OF THE INVENTION

The present invention has been accomplished to overcome the above problems. An object of the present invention is to provide an elevator control apparatus that is relatively inexpensive and yet capable of both cancelling the offset voltage of current detectors and outputting a current command even during the stoppage period of the inverter.

In order to achieve the above object, according to the present invention, there is provided an elevator control apparatus comprising: a converter for converting AC power into DC power; an inverter for converting the DC power resulting from the conversion by the converter into AC voltage of a variable voltage and a variable frequency so as to drive with the AC voltage an induction motor for vertically moving a car of the elevator; a current detector for detecting the current output by the inverter and for producing an output signal indicative of the detected current; a current command generating circuit for generating a current command value for the induction motor; a control circuit for controlling the inverter on the basis of both the current command value from the current command generating circuit and the output signal from the current detector; and a cancellation circuit for cancelling offset voltage by storing, when the inverter is stopped while the current command generating circuit keeps generating the current command value, the output signal of the current detector, and by adding, when the inverter is in operation, the stored output signal to the present output signal of the current detector.

DESCRIPTION OF THE PREFERRED EMBODIMENT

Figure 1:
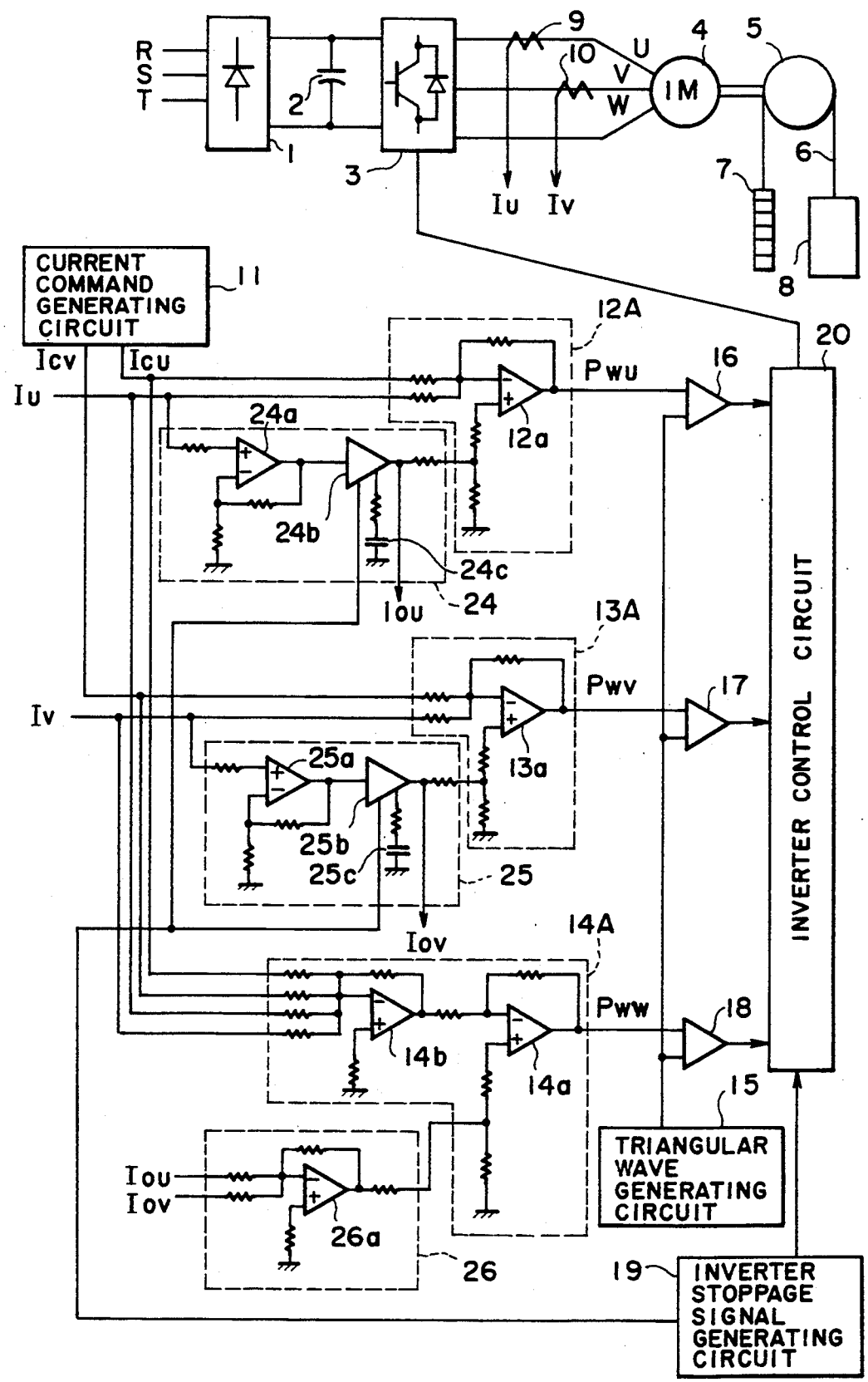
FIG. 1 is a circuit diagram showing an elevator control apparatus according to an embodiment of the present invention.
Figure 2:
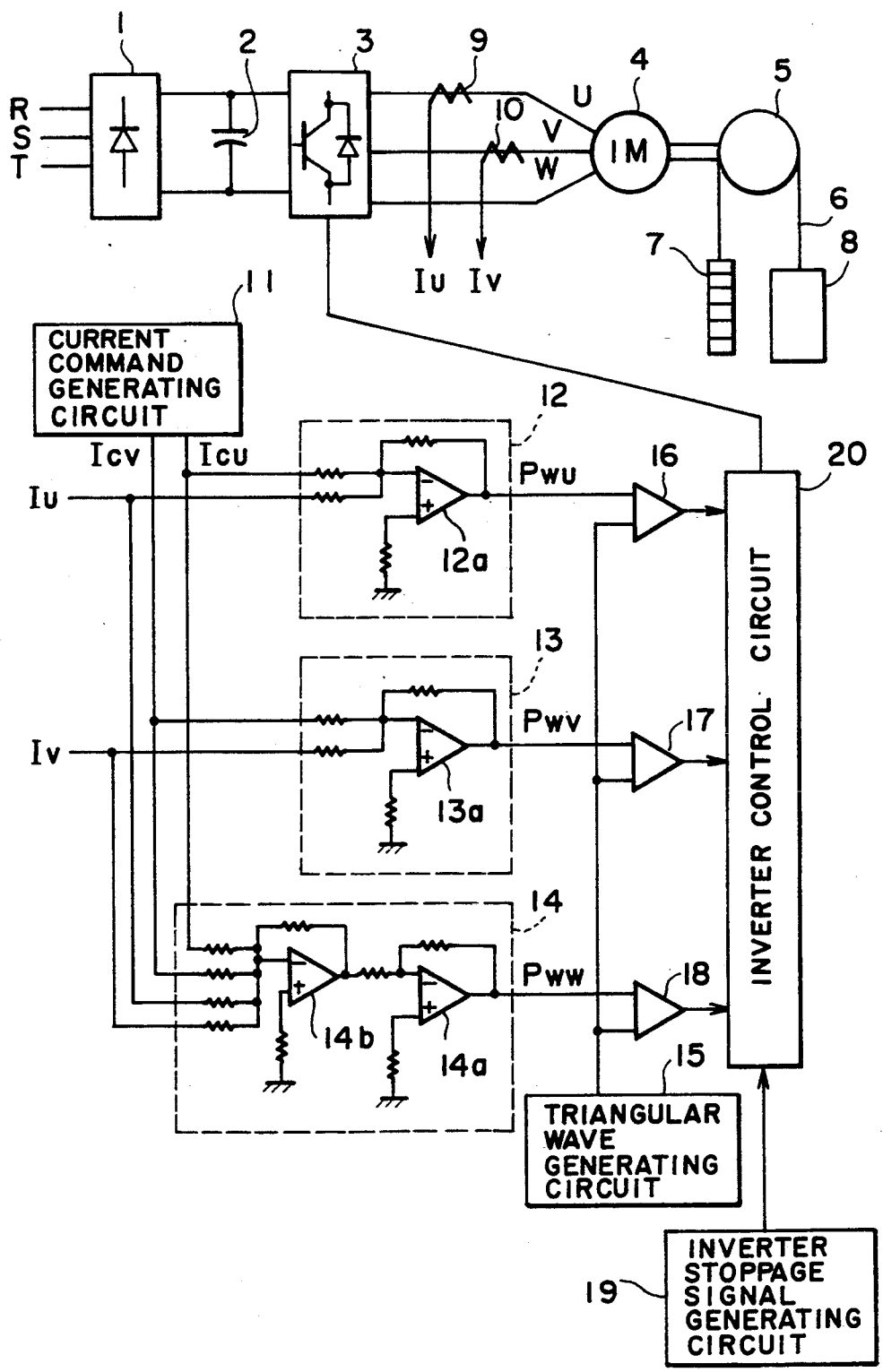
FIG. 2 is a circuit diagram showing a conventional elevator control apparatus.
Figure 3:
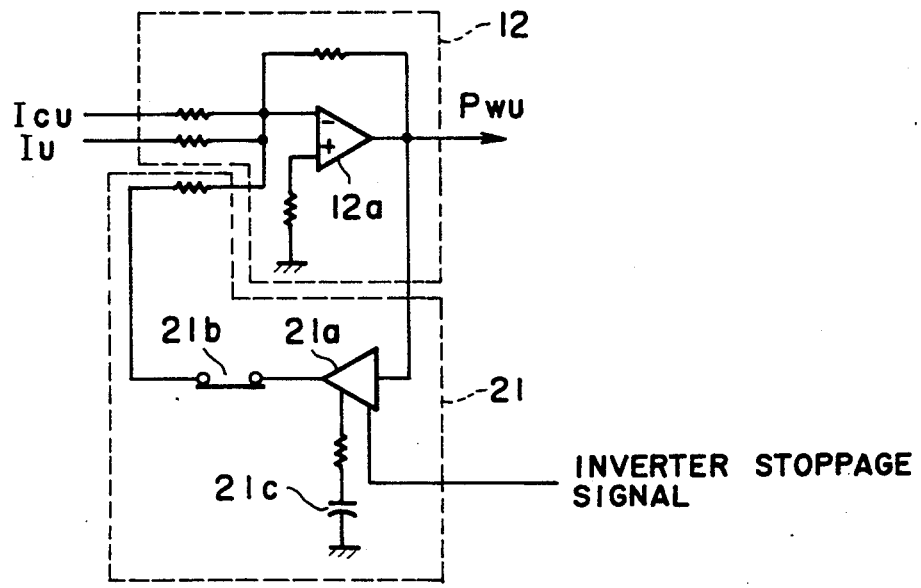
FIG. 3 is a circuit diagram showing a conventional offset voltage cancellation circuit.
Figure 4:
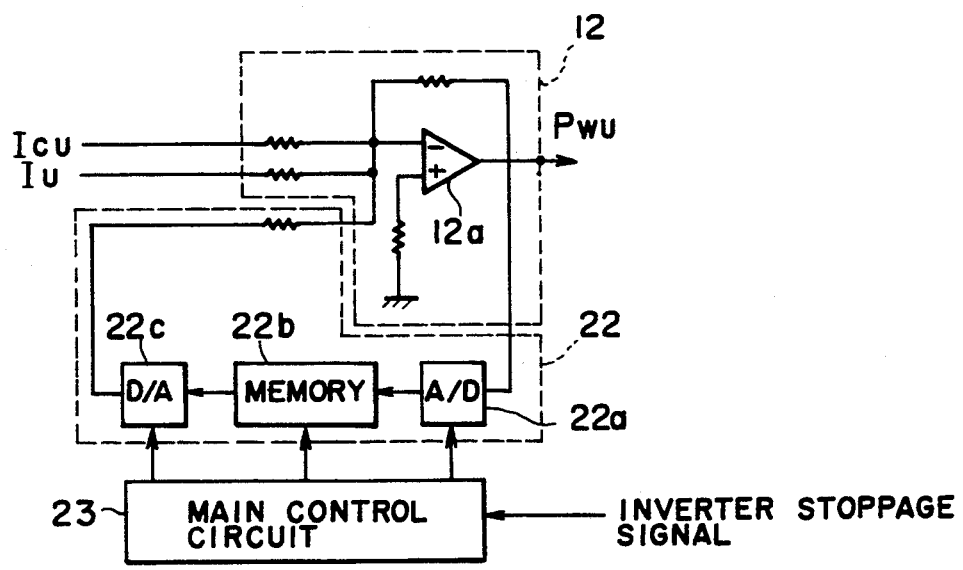
FIG. 4 is a circuit diagram showing another conventional offset voltage cancellation circuit.

Embodiments of the present invention will now be described with reference to the accompanying drawings. Referring to FIG. 1, an elevator control apparatus according to an embodiment of the present invention includes a converter 1 connected through a smoothing capacitor 2 to an inverter 3, which inverter is in turn connected to an induction motor 4. The induction motor 4 is connected with a sheave 5 on which a rope 6 is wound, one end of the rope 6 being connected to a counterweight 7, and the other to an elevator car 8.

A current command generating circuit 11 of the apparatus is connected with operational amplifiers 12A, 13A and 14A for U-, V- and W-phases, respectively.

These operational amplifiers 12A, 13A and 14A are connected with an offset voltage cancellation circuit 24, another offset voltage cancellation circuit 25, and an operational amplifier 26, respectively. The operational amplifiers 12A and 13A are to be supplied with the respective outputs of current detectors 9 and 10 for detecting the U-phase and V-phase components, respectively, of phase current for an induction motor 4, while the operational amplifier 14A is to be supplied with both of the outputs of the current detectors 9 and 10. The operational amplifiers 12A, 13A and 14A are connected, via comparators 16, 17 and 18, respectively, to an inverter control circuit 20 for controlling the inverter 3. The inverter control circuit 20 is connected with an inverter stoppage signal generating circuit 19. The comparators 16, 17 and 18 are connected to a triangular wave generating circuit 15.

Each of the offset voltage cancellation circuits 24 or 25 has an amplifier 24a or 25a to be supplied with the output of the current detector 9 or 10, a sample-and-hold circuit 24b or 25b for sampling the outputs of the amplifier 24a or 25a in response to a signal from the inverter stoppage signal generating circuit 19, and a capacitor 24c or 25c for allowing a value sampled by the sample-and-hold circuit 24b or 25b to be maintained. The operational amplifier 26 has a differential amplifier 26a to be supplied with the outputs of the offset voltage cancellation circuits 24 and 25.

The apparatus according to the present invention operates in the following manner. When the elevator car 8 is stopped, the inverter 3 is also stopped and no current flows to the induction motor 4. Under these conditions, the outputs (current feedback signals) $I_u$ and $I_v$ of the current detectors 9 and 10 represent only the offset voltage of detectors 9 and 10. To describe operation provided with respect to the U-phase, the amplifier 24a is provided in view of the fact that an offset voltage is generally small (from several to ten and several mV) and in order to effectively use the input voltage range of the sample-and-hold circuit 24b so as to reduce the influence of a drop in the holding voltage of the sample-and-hold circuit 24b caused by leakage current from the capacitor 24c. If the amplifier 24a has a gain $K_i$, the current feedback signal $I_u$ supplied thereto from the current detector 9 is multiplied by $K_i$, and then output to the sample-and-hold circuit 24b. The sample hold circuit 24b, which is in its sampling state in accordance with an inverter stoppage signal from the inverter stoppage signal generating circuit 19, stores the amplifier output $I_u \times K_i$ as an offset voltage $I_{ou}$. Thereafter, when, in order to start the car 8, the inverter stoppage signal is extinguished to start the inverter 3, the sample-hold-circuit 24b is brought to its holding state, in which the amplifier output $I_u \times K_i$, that is, the offset voltage $I_{ou}$, stored during the stoppage period of the inverter 3, is output from the offset voltage cancellation circuit 24. If the differential amplifier 12a has a gain $K_n$ on the inverted input side thereof and a gain $K_p$ on the non-inverted input side thereof, the offset voltage $I_{ou}$ is applied to the non-inverted input side of the differential amplifier 12a while in the state of multiplied by $K_n/(K_p \cdot K_i)$ (a value determined by the resistance of the non-inverted input side of the differential amplifier 12a).

Thus, the following relationship is established between the gain $K_n$ on the inverted input side and the gain $K_p$ on the non-inverted input side of the differential amplifier 12a:

$$I_u \cdot (-K_n) = I_u \cdot K_i \cdot K_p \{K_n/K_p \cdot K_i)\}$$

$$|-I_u| = |I_u|$$

Accordingly, the output $I_u$ of the current detector 9, that is, the offset voltage thereof, is cancelled, and is not included in the output $P_{wu}$ of the operational amplifier 12A. On the other hand, the current command value $I_{cu}$ does not relate to the above operation, and this value does not influence the output $P_{wu}$ of the operational amplifier 12A even when it is operated on and amplified by the amplifier 12A. The apparatus provides the same operation as that described above with respect to the V-phase.

With respect to the W-phase, since the respective outputs $I_u$ and $I_v$ of the current detectors 9 and 10 are added together by the operational amplifier 14A, the offset voltage components of these outputs are also added together. Therefore, the apparatus provides the following operation. After the results of multiplying the outputs $I_u$ and $I_v$ by $K_i$, stored during the stoppage period of the inverter 3, that is, the offset voltages $I_{ou}$ and $I_{ov}$, have been added together, the sum is multiplied by the differential amplifier 26a by $K_j$ (gain of the amplifier 26a). If the differential amplifier 14a has a gain $K_q$ on the inverted input side thereof and a gain $K_d$ on the non-inverted input side thereof while the differential amplifier 14b has a gain of $-1$ on the inverted input side thereof, the output of the differential amplifier 26a is applied to the non-inverted input side of the differential amplifier 14a while in the state of multiplied by $K_q/(K_d \cdot K_i \cdot K_j)$ (a value determined by the resistance of the non-inverted input side of the differential amplifier 14a). Since $I_u + I_v = -I_w$, the following relationship is established between the gain $K_q$ on the inverted input side and the gain $K_d$ on the non-inverted input side of the differential amplifier 14a:

$$-I_w \cdot \{-(-K_q)\} = -I_w \cdot K_i \cdot (-K_j) \cdot K_d \cdot \{K_q/(K_d \cdot K_i \cdot K_j)\}$$

$$|-I_w| = |I_w|$$

Accordingly, the output $I_w$, synthesized from the outputs (offset voltages) of the current detectors 9 and 10, is cancelled, and is not included in the output $P_{ww}$ of the operational amplifier 14A. On the other hand, the current command values $I_{cu}$ and $I_{cv}$ do not relate to the above operation, and these values do not influence the output $P_{ww}$ of the operational amplifier 14A even when they are operated on and amplified by the amplifier 14A.

According to the above embodiment of the present invention, therefore, it is possible to cancel the offset voltage of the current detectors 9 and 10 though the current command generating circuit 11 keeps outputting a current command even during a stoppage period of the inverter 3. The cancellation makes it possible to restrain torque ripple caused by the offset voltage, and hence, prevent vibration of the elevator car 8, thereby enabling comfortable rides therein. Since the current command generating circuit 11 continues outputting a current command even during a stoppage period of the inverter 3, it is possible to detect a fault, if there is any, in the inverter stoppage signal generating circuit 19, thereby enabling the elevator control apparatus to be constructed as an apparatus of a higher safety level. The elimination of the need to shut off such outputs renders elements, such as a contact, D/A and A/D converters and a memory, unnecessary, thereby enabling the apparatus to be relatively inexpensive. Another advantage of the embodiment of the present invention relates to a drawback of the use of a sample-hold-circuit, that is, a risk of leakage current from the associated capacitor causing a drop in the holding voltage. In the above embodiment, since the input voltage range of a sample-and-hold circuit 24b, 25b is effectively used, and the current feedback signal is multiplied by $K_i$ to store the offset voltage, it is possible to reduce the influence of leakage current. In the above embodiment, the outputs $I_u$ and $I_v$ of the current detectors 9 and 10 are sampled during a stop period of the elevator car 8, that is, a stoppage period of the inverter 3, and these outputs are held during an operation period of the inverter 3. Since a stoppage period of the inverter 3 generally lasts at least several minutes, there will be a sufficiently long period for sampling. This permits a capacitor of a sufficiently large capacitance to be used for the holding period, and, accordingly, there is substantially no risk of holding voltage drop.

Although in the embodiment shown in FIG. 1, a current-detector-offset cancellation voltage is applied to the non-inverted input side of a differential amplifier 12a, 13a, 14a, the differential amplifier 24a, 25a may be alternatively constructed as an inversion-type amplifier so that an offset cancellation voltage is, after adjusted with a suitable gain, applied to the inverted input side of the differential amplifier 12a, 13a, 14a.

What is claimed is:

1. An elevator control apparatus comprising:
   a converter for converting AC power into DC power;
   an inverter for converting the DC power resulting from the conversion by said converter into AC voltage of a variable voltage and a variable frequency so as to drive with the AC voltage an induction motor for vertically moving a car of said elevator;
   a current detector for detecting the current output by said inverter and for producing an output signal indicative of the detected current;
   a current command generating circuit for generating a current command value for said induction motor;
   a control circuit for controlling said inverter on the basis of both the current command value from said current command generating circuit and the output signal from said current detector; and
   a cancellation circuit for cancelling offset voltage by storing, when said inverter is stopped while said current command generating circuit keeps generating the current command value, the output signal of said current detector, and by adding, when the inverter is in operation, the stored output signal to the present output signal of said current detector.

2. A control apparatus according to claim 1 further comprising an inverter stoppage signal generating circuit for generating, on the basis of a car speed command, a stoppage signal for commanding said control circuit to bring said inverter to stoppage.

3. A control apparatus according to claim 2 wherein said cancellation circuit includes an amplifier for amplifying the output signal of said current detector with a predetermined gain, a sample-and-hold circuit for sampling outputs of said amplifier, and a capacitor for maintaining a value sampled by said sample-and-hold circuit.

4. A control apparatus according to claim 3 wherein said sample-and-hold circuit is in its sampling state when supplied with the stoppage signal generated from said inverter stoppage signal generating circuit, and is in its holding state when not supplied with the stoppage signal.

5. A control apparatus according to claim 1 wherein said inverter outputs three-phase AC current of U-phase, V-phase and W-phase, said current detector comprising a U-phase detector and a V-phase detector for respectively detecting the U-phase current and V-phase current from said inverter, said cancellation circuit comprising a U-phase cancellation circuit for inputting the output of said U-phase detector, a V-phase cancellation circuit for inputting the output of said V-phase detector, and a W-phase cancellation circuit for adding together the outputs of said U-phase and V-phase cancellation circuits.

6. An elevator control apparatus comprising:
   a converter for converting AC power into DC power;
   an inverter for converting the DC power into AC voltage having a variable voltage and a variable frequency so as to drive an induction motor with the AC voltage;
   a first phase current detector for detecting a first phase of the current output by said inverter and for producing an output signal indicative of the first phase of the detected current;
   a second phase current detector for detecting a second phase of the current output by said inverter and for producing an output signal indicative of the second phase of the detected current;
   a current command generating circuit for generating a current command value for the induction motor;
   a control circuit for controlling said inverter on the basis of both the current command value generated by said current command generating circuit and the output signal produced by said first and second current detectors;
   means for generating an inverter stoppage signal;
   a first phase cancellation circuit connected to said first phase current detector comprising an amplifier having an output connected to a sample and hold circuit;
   a second phase cancellation circuit connected to said second phase current detector comprising an amplifier having an output connected to a sample and hold circuit;
   a third phase cancellation circuit connected to said first and second phase cancellation circuits, said third phase cancellation circuit comprising a differential amplifier;
   wherein said first phase cancellation circuit produces a signal indicative of a first phase offset voltage, said second phase cancellation circuit produces a signal indicative of a second phase offset voltage and said third phase cancellation circuit produces a signal indicative of the sum of the first and second phase offset voltages.

7. An offset voltage cancellation circuit for an inverter comprising:
   a first phase current detector connected to a first phase output of the inverter;
   a second phase current detector connected to a second phase output of the inverter;
   a first phase cancellation circuit connected to said first phase current detector comprising an amplifier having an output connected to a sample and hold circuit;

a second phase cancellation circuit connected to said second phase current detector comprising an amplifier having an output connected to a sample and hold circuit;

a third phase cancellation circuit connected to said first and second phase cancellation circuits, said third phase cancellation circuit comprising a differential amplifier; and means for generating an inverter stoppage signal connected to the sample and hold circuits of said first phase cancellation circuit and said second phase cancellation circuit, respectively;

whereby said first phase cancellation circuit produces a signal indicative of a first phase offset voltage, said second phase cancellation circuit produces a signal indicative of a second phase offset voltage and said third phase cancellation circuit produces a signal indicative of the sum of the first and second phase offset voltages.

* * * * *